(12) United States Patent
Chang et al.

(10) Patent No.: US 11,011,203 B1
(45) Date of Patent: May 18, 2021

(54) PATTERNED THERMAL ABSORPTION LAYER FOR GRANULAR STORAGE MEDIA

(71) Applicant: Seagate Technology LLC, Fremont, CA (US)

(72) Inventors: Thomas Y. Chang, Menlo Park, CA (US); Philip L. Steiner, Los Altos, CA (US); Paul M. Jones, Palo Alto, CA (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 16/863,583

(22) Filed: Apr. 30, 2020

Related U.S. Application Data (60) Provisional application No. 63/013,965, filed on Apr. 22, 2020.

(51) Int. Cl.

| | |
|---|---|
| *G11B 5/09* | (2006.01) |
| *G11B 20/12* | (2006.01) |
| *G11B 5/708* | (2006.01) |
| *G11B 13/08* | (2006.01) |
| *G11B 5/74* | (2006.01) |
| *G11B 5/00* | (2006.01) |

(52) U.S. Cl.
CPC .......... *G11B 20/1258* (2013.01); *G11B 5/708* (2013.01); *G11B 5/746* (2013.01); *G11B 13/08* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 5,656,370 A * | 8/1997 | Murakami | G11B 7/2578 369/13.38 |
| 7,251,089 B2 | 7/2007 | Peng | |
| 8,576,672 B1 | 11/2013 | Peng et al. | |
| 10,109,309 B1 * | 10/2018 | Jubert | H01F 10/10 |
| 2001/0048568 A1 * | 12/2001 | Ikeda | G11B 5/59633 360/59 |
| 2006/0024529 A1 * | 2/2006 | Murakami | G11B 5/1278 428/810 |
| 2007/0116917 A1 * | 5/2007 | Kim | G11B 7/24038 428/64.4 |

* cited by examiner

*Primary Examiner* — Peter Vincent Agustin
(74) *Attorney, Agent, or Firm* — Holzer Patel Drenan (57) ABSTRACT

A heat-assisted magnetic recording device includes a granular magnetic recording layer and a thermal absorption layer formed on top of the magnetic recording layer. The thermal absorption layer is patterned to include rows extending in a cross-track direction of the magnetic media, each adjacent pair of the rows being separated from one another by an insulating material.

20 Claims, 7 Drawing Sheets

PATTERNED THERMAL ABSORPTION LAYER FOR GRANULAR STORAGE MEDIA

BACKGROUND

In patterned media devices, magnetic material on a disc is patterned or grown into small isolated islands or "grains" such that there exists a single magnetic domain in each island or grain. Each single magnetic domain can be a single grain or a plurality of strongly coupled grains that switch magnetic states in concert as a single magnetic volume. This is in contrast to conventional non-patterned media wherein a single "bit" may have multiple magnetic grains separated by grain boundaries. The media may be fabricated so that there is no magnetic material in the regions between the islands.

While patterned media are viewed preferentially as a promising tool for effectively deferring the superparamagnetic limit (an areal density limit at which thermal fluctuations in the media spontaneously switch the polarization of recorded bits), currently favored techniques for creating patterned media tend to cause damage to the magnetic islands, leading to grain-to-grain inconsistencies in characteristics such as coercivity distribution, switching field distribution or the grain-to-grain deviations in Curie temperature. This damage to the magnetic islands tends to increase as the pattern density increases. Consequently, conventional patterning methods are not conducive to high density pattern formation.

SUMMARY

According to one implementation, a magnetic media includes a granular recording layer and a thermal absorption layer formed on top of the magnetic recording layer. The thermal absorption layer is patterned to include rows extending in a cross-track direction of the magnetic media and each adjacent pair of the rows are separated from one another by an insulating material.

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations as further illustrated in the accompanying drawings and defined in the appended claims.

DETAILED DESCRIPTION

Currently-favored techniques for manufacturing granular recording layers in magnetic media tend to produce magnetic grains that lack uniformity in magnetic properties such as coercivity distribution, switching field distribution, and Curie temperature. These grain-to-grain inconsistencies are known to contribute to an increase in write errors as well as a degradation of the attainable signal-to-noise ratio (SNR). At the same time, it is known that this degradation can be reversed and potentially overcome by improving the head/media thermal gradient.

As used herein, the "head/media thermal gradient" refers to the thermal gradient observed in a heat-assisted magnetic recording (HAMR) device that exists between (1) a data bit on the media currently being heated and subjected to a write transition and (2) an immediately adjacent data bit that has already passed below the write element immediately before the current write transition.

The current state of heat-assisted magnetic recording (HAMR) shows that currently-attainable SNR values are far below the theoretic limit that could be supported at a given grain size. It is theorized that if the head/media thermal gradient were to be sufficiently increased in comparison to that observed in existing granular media devices, the SNR could be increased to the highest theoretically achievable SNR value. This increase in SNR would allow for a reduction in grain size and, consequently, an increase in media areal density. For example, the current thermal gradient in HAMR devices is approximately 7-9 K/nm. If this thermal gradient could be increased to a value greater than about 30 K/nm, the media areal density could be increased by 50-100%.

According to one implementation, the herein disclosed technology provides for a patterned thermal absorption layer that is formed on top of a granular magnetic recording layer in a HAMR device. The patterned thermal absorption layer can significantly improve the SNR of the device by increasing the effective thermal gradient, thereby mitigating performance-degrading effects of inconsistent grain-to-grain properties.

Figure 1:
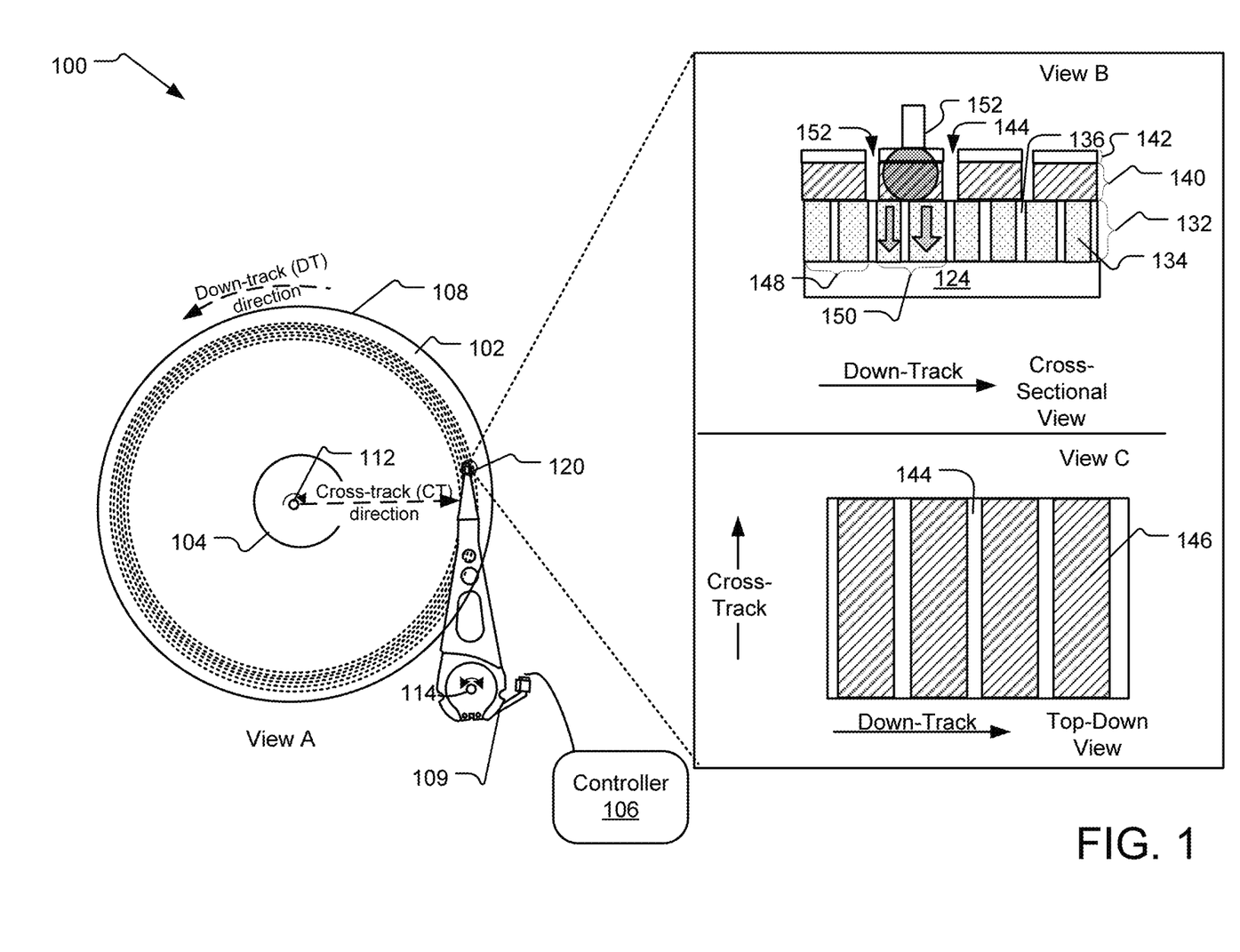
FIG. 1 illustrates an example data storage device that includes a magnetic media with a patterned thermal absorption layer.

FIG. 1 illustrates an example data storage device 100 that includes a magnetic media 108 with a patterned thermal absorption layer 140 (see View B) formed on top of a granular magnetic recording layer 132. The granular magnetic recording layer 132 includes multiple magnetic grains separated from one another by non-magnetic material. During a recording process, data may be recorded in the magnetic media by selectively transitioning polarity of the magnetic grains in the magnetic recording layer 132 using a magnetic write pole (not shown) on a transducer head assembly 120. As illustrated in View A, the magnetic media 108 rotates about a spindle center or a disc axis of rotation 112 and includes an inner diameter 104 and an outer diameter 102 between which are a number of concentric data tracks.

The transducer head assembly 120 is mounted on an actuator assembly 109 at an end distal to an actuator axis of rotation 114. The transducer head assembly 120 flies in close proximity above the surface of the magnetic media 108 during disc rotation. The actuator assembly 109 rotates during a seek operation about the actuator axis of rotation 114. The seek operation positions the transducer head assembly 120 over a target data track for read and write operations.

In a HAMR device, the magnetic grains on the magnetic media 108 are temporarily heated during the recording process to selectively lower magnetic coercivity in a tightly focused area that substantially corresponds to an individual data bit. For example, light from a heat source (not shown) may be directed into a waveguide (not shown) and focused via a Near Field Transducer (NFT) 152 to a bit location on the magnetic media 108 as the bit location is subjected to a magnetic generated by the write pole. The heated region is then encoded with the recorded data bit based on the polarity of an applied magnetic write field. After cooling, the magnetic coercivity substantially returns to its pre-heating level, thereby stabilizing the magnetization for that data bit. This write process is repeated for multiple data bits on the storage medium, and such data bits can be read using a magneto-resistive read head.

The cross-sectional view of the magnetic media 108 illustrated in View B of FIG. 1 includes a layer stack 124, which may in different implementations include a variety of different layers formed on top of a substrate, such as those exemplary layers described below with respect to FIG. 2. A granular magnetic recording layer 132 is formed on top of the layer stack 124 and includes magnetic islands or grains (e.g., a grain 134) positioned at fixed locations separated from one another by non-magnetic material (e.g., non-magnetic material 136). In different implementations, the magnetic grains may be formed by any of a number of different processes including subtractive processes (e.g., processes that create the magnetic islands by milling or etching into a magnetic layer and then backfilling with non-magnetic material) or alternatively by one or more additive processes (e.g., processes that create the magnetic islands by causing magnetic grains to nucleate at growth sites on a seed layer). Depending on the methodology utilized to create the granular magnetic recording layer 132, the magnetic islands may be shaped and arranged according to a select pattern or, instead, shaped and arranged either at random or semi-random.

The patterned thermal absorption layer 140 is formed on top of the granular magnetic recording layer 132, and an overcoat layer 142 (e.g., a carbon overcoat or other protective layer) is formed on top of the patterned thermal absorption layer 140. Depending on the manufacturing process employed, the overcoat layer 142 may or may not be patterned to match a pattern of the patterned thermal absorption layer 140. In one implementation, the patterned structure illustrated in View B of FIG. 1 is formed by depositing material of the patterned thermal absorption layer 140 on top of the granular magnetic recording layer 132; depositing the overcoat layer 142 on the patterned thermal absorption layer 140; and etching through both of the patterned thermal absorption layer 140 and the overcoat layer 142 to create gaps (e.g., a gap 144) in the material of the patterned thermal absorption layer 140. A variety of other manufacturing processes may be employed in other implementations, some of which are discussed herein with respect to FIG. 2-7, below.

In some implementations, the gaps (e.g., gap 144) between the islands of patterned thermal absorption layer 140 are used by the storage device 100 to indicate boundaries of data bits (e.g., groups of grains that are transitioned together to hold a single bit of data). For example, in FIG. 1, a single data bit 150 is defined below the island of patterned thermal absorption layer 140 that is between gaps 144 and 152.

The gaps (e.g., gaps 144, 152) in the patterned thermal absorption layer 140 are filled with insulating material (e.g., air or other insulator) which serves to prevent the lateral spread of heat between adjacent grains in the granular recording layer. This is illustrated in View B via arrows that indicate the flow of heat downward from the NFT 152 is directed downward toward the directly-underlying grains that collectively define a single data bit 150. The insulating material in the gaps of the patterned thermal absorption layer 140 prevents this heat from spreading laterally in the down-track direction to other adjacent data bits, such as the data bit 148. Consequently, a large thermal gradient is observed between adjacent data bits 148 and 150. In one implementation, this observed thermal gradient is approximately 15-20 degrees on the Kelvin scale per nanometer while an otherwise identical HAMR device and media lacking the patterned thermal absorption layer 140 may provide for a gradient on the order of about 9 degrees K per nanometer. This increased thermal gradient has the effect of improving the SNR of the media and decreasing the write error rate, allowing for a potentially significant corresponding increase in areal recording density.

In one implementation, the patterned thermal absorption layer 140 includes a thermally conductive metal or metal alloy with optical extinction value (k) that is at least 0.8. This optical extinction coefficient may be greater in value than the optical extinction value (k) of the overcoat layer 142. For example, the patterned thermal absorption layer 140 may have an optical extinction value (k) that is at least 0.8 while the overcoat layer 142 has a k value in the range of 0.5 to 0.6. Although the thermal conductivity of the patterned thermal absorption layer 140 may vary from one implementation to another, this thermal conductivity is, in one implementation, equal to or greater than the thermal conductivity of the granular magnetic recording layer 132. In general, the thermal conductance across each gap (e.g., gap 144) in the patterned thermal absorption layer 140 is significantly lower than the thermal conductance within each island of patterning within the layer.

In the illustrated implementation, a controller 106 of the storage device 100 is configured to control the writer (not shown) to generate the magnetic transitions in the granular recording layer 132 of the magnetic media 108 to store data. In general, it is to be understood that the controller 106 of FIG. 1 may include software stored on a tangible computer-readable storage medium. As used herein, the term "tangible computer-readable storage media" excludes transitory propagating signals (e.g., carrier waves) but includes physically-manufactured media (memory devices) including without limitation RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can accessed by mobile device or computer.

Figure 2:
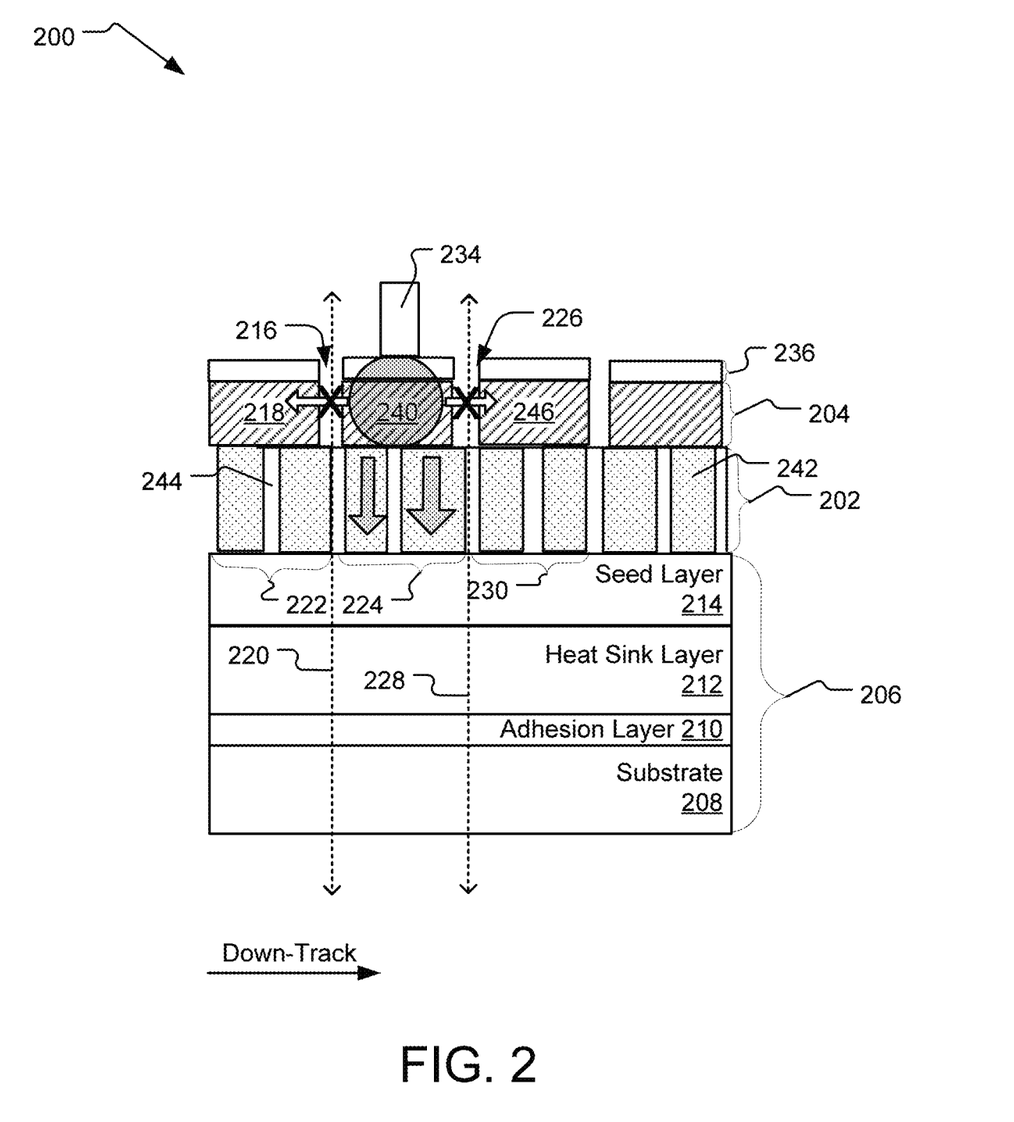
FIG. 2 illustrates a cross-sectional view of another example magnetic media with a patterned thermal absorption layer.

FIG. 2 illustrates a cross-sectional view of another example storage media 200 with a thermal absorption layer 204 patterned to improve a head/media thermal gradient. Characteristics of the magnetic media not described explicitly with respect to FIG. 2, below, may be assumed to be the same or similar to those described with respect to FIG. 1 or other implementations disclosed herein.

The storage media 200 includes a granular magnetic recording layer 202 formed on top of a stack of layers 206. In different implementations, the stack of layers 206 may differ in composition and purpose. In the illustrated implementation, the stack of layers includes a substrate 208 which may include any substrate material such as ceramic glass, amorphous glass, aluminum, etc. An adhesion layer 210 is disposed between the substrate 208 and a heat sink layer 212 is formed on the adhesion layer 210 to promote adhesion between the substrate 208 and the heat sink layer 212 by reducing the potential for delamination of the substrate 208 from the rest of the layered structure.

The heat sink layer 212 comprises metal or a metal alloy, and may include one or more materials such as Ag, Cu, Au, Al, Cr, Mo, W, etc. In some implementations, the heat sink layer 212 is grown with a particular orientation over the substrate 208 to help facilitate directional growth of subsequently-formed layers in the stack.

A seed layer 214 is deposited over the heat sink layer 212 and serves to control the amount or rate of heat conducted out of the granular magnetic recording layer 202 and into the underlying sink layer. In various implementations, the seed layer may serve other additional functions as well, such as preventing interdiffusion between adjacent layers and/or serving to orient and/or control grain size of magnetic grains included in the granular magnetic recording layer 202.

The granular magnetic recording layer 202 includes magnetic grains (e.g., a magnetic grain 242) and magnetic segregant (e.g., segregant material 244) separating the magnetic grains from one another. The non-magnetic segregant may comprise one or more of crystallized $ZrO_2$ and amorphous segregants like C, $SiO_2$, $Al_2O_3$, $Si_3N_4$, $TiO_2$, $WO_3$, $Ta_2O_5$, BN, or another alternative oxide, nitride, boride, or carbide material. Suitable materials for the magnetic grains include, for example FePt, FeXPt alloy, FeXPd alloy, and $Co_3Pt$. The granular magnetic recording layer 202 can have a thickness ranging from about five to about thirty nanometers.

A thermal absorption layer 204 is formed on top of the granular magnetic recording layer 202 and comprises a thermally conductive material, preferably one that is as conductive or more conductive than the granular magnetic recording layer 202. The thermal absorption layer 204 is patterned via any suitable process such as milling or selective etching to include alternating gaps (e.g., a gap 216) and islands (e.g., an island 218) in the down-track direction of the media 200. In one implementation, this is achieved by patterning material of the thermal absorption layer 204 into rows that extend in the cross-track direction of a media, as generally shown in View C of FIG. 1. The specific pattern employed (e.g., size and shape of the islands) in the thermal absorption layer 204 may vary from one implementation to another.

In FIG. 2, each island (e.g., the islands 218, 240, 246) in the thermal absorption layer 204 has a down-track direction width that corresponds to a group of underlying magnetic grains that collectively form an individual data bit (e.g., grains transitioned as a single unit to store a single bit of data). Each gap in the thermal absorption layer 204 is positioned to substantially align with a boundary between two data bits on the storage media 200. For example, the island 218 overlies a group of grains that are transitioned together to store a first data bit 222; the island 240 overlies with a group of grains that are transitioned together to store a second data bit; and the island 246 is overlies with a group of grains that are transition together to store a third data bit 230. Notably, there may not exist a precise vertical alignment between the gaps 216, 226 in the patterned thermal absorption layer 204 and the boundaries between individual grains in the granular magnetic recording layer 202. However, the gaps 216, 226 in the patterned thermal absorption layer 204 may be used to time the individual write transitions of the storage device such that any grain with a majority of its magnetic domain under a particular one of the islands 218, 240, 246, etc. is transitioned as part of the data bit that generally underlies that island.

During nominal storage device operations, the storage media 200 rotates on an axis below a write element including an NFT 234 that focuses heat on the storage media 200. During a write operation to an individual data track on the media, a device controller (not shown) controls a write element to execute write transitions to a series of data bits contiguously-arranged along the track. These transitions are precisely timed by a storage device controller such that each data bit in the series underlies a different one of the islands (cross-track rows) of the thermal absorption layer 204.

A variety of considerations may drive the relative sizes of the islands and gaps in the thermal absorption layer 204. In general, a larger island (e.g., island 240) provides better heat absorption and more efficiently heats the underlying granular magnetic recording layer 202. However, if the gaps between islands of the patterned thermal absorption layer 204 are too small, a greater amount of heat may flow across the gap. Also, if the gaps are so big that individual magnetic grains in the granular magnetic recording layer 202 exist between the gaps, these stray grains may negatively influence device performance. By example and without limitation, a suitable gap-to-island duty cycle may range from about 1/9 (meaning the island has about 9× the down-track width as the gap) to 1/1 (meaning that the island and the gap have an approximately equal down-track width).

In the illustrated implementation, the gaps in the thermal absorption layer 204 are filled with air, which serves to laterally insulate adjacent data bits in the granular recording media from one another. In other implementations, the gaps may be filled with another isolating material.

An overcoat layer 236 is formed on top of the thermal absorption layer 204. The overcoat layer 236 serves to seal and protect the thermal absorption layer from corrosion and to provide a smooth continuous surface that may glide beneath the read/write head. In one implementation, the overcoat layer 236 includes diamond-like carbon or silicon nitride (SiN). In some implementations, the overcoat layer 236 may also include a lubricant layer.

In FIG. 2, the NFT 234 is shown heating the underlying data bit 224. Material in the island 240 of the thermal absorption layer 204 concentrates this heat on the data bit 224 and the gaps 216 and 226 laterally contain the spread of heat within the cross section of the thermal absorption layer 204 in the down-track direction of the storage media 200, effectively increasing the thermal gradient during writing.

Figure 3:
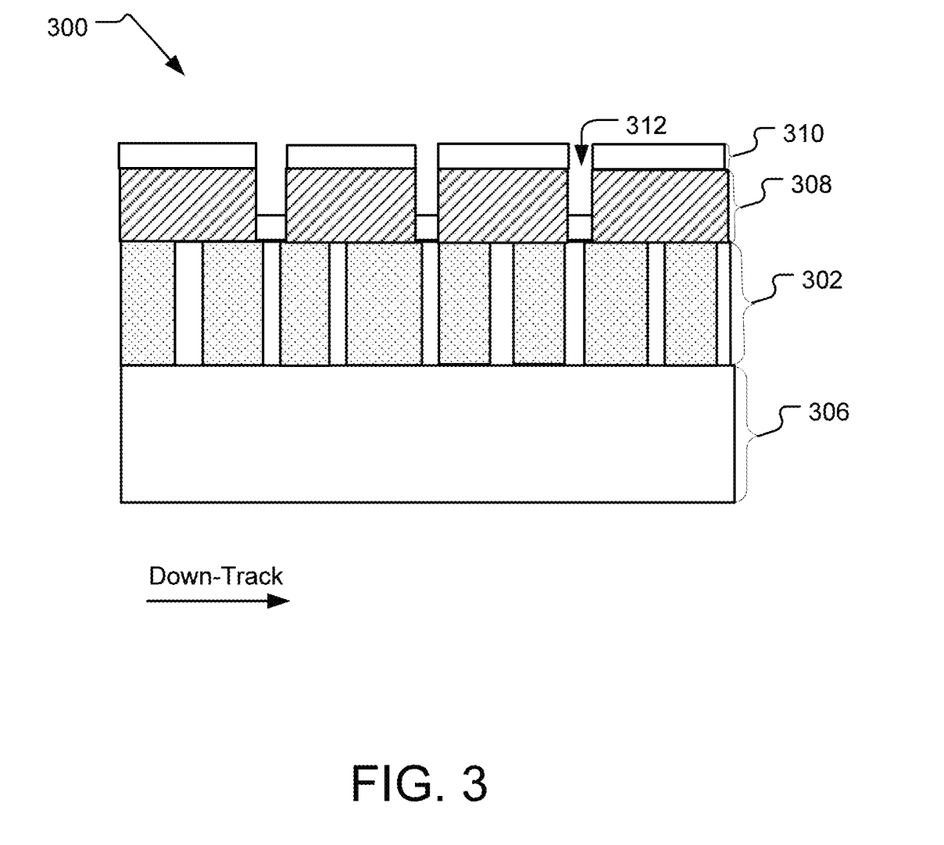
FIG. 3 illustrates a cross-sectional view of yet another example magnetic media with a patterned thermal absorption layer.

FIG. 3 illustrates a cross-sectional view of yet another example magnetic media 300 with a patterned thermal absorption layer 308. Characteristics of the magnetic media not described explicitly with respect to FIG. 3, below, may be assumed to be the same or similar to other implementations disclosed herein. The magnetic media 300 includes a layered stack 306 and a granular magnetic recording layer 302 formed on the top of the layered stack 306. The granular recording layer 302 includes magnetic islands separated from one another by non-magnetic material. In one implementation, the magnetic islands are generally aligned in rows extending in the cross-track direction of the magnetic media 300 (e.g., into the page). A patterned thermal absorption layer 308 is formed on top of the granular magnetic recording layer 302. An overcoat layer 310 (e.g., a carbon overcoat) is formed on top of the patterned thermal absorption layer 308.

In contrast to FIG. 2, the magnetic media 300 of FIG. 3 includes material of the overcoat layer 310 deposited in the gaps (e.g., a gap 312) between islands of the patterned thermal absorption layer 308. In one implementation, patterned thermal absorption layer 308 and overcoat layer 310 are formed by (1) depositing material of the patterned thermal absorption layer 308 on top of the granular magnetic recording layer 302 (2) selectively etching through the deposited material to create the gaps (e.g., the gap 312); and (3) depositing material of the overcoat layer 310 on top of the patterned thermal absorption layer 308 and within the gaps.

The illustrated design of FIG. 3 does provide some advantages different from the design illustrated in FIG. 2. First, the granular magnetic recording layer 302 is fully encapsulated by the overlying layers. As such, the granular magnetic recording layer 302 is protected from potential corrosion. This corrosivity protection may be realized at the expense of a small loss in thermal gradient due to potential for some small amount of thermal conduction by the overcoat layer 310 within the gaps of the patterned thermal absorption layer 308. In addition to the above, the design of FIG. 3 may be easier to mechanically create than the design of FIG. 2 due, in part, to the fact that the etch depth is shallower and because the potentially hard (e.g., carbon or similar) material of the overcoat layer 310 is not subjected to the etch in the design of FIG. 3.

Figure 4:
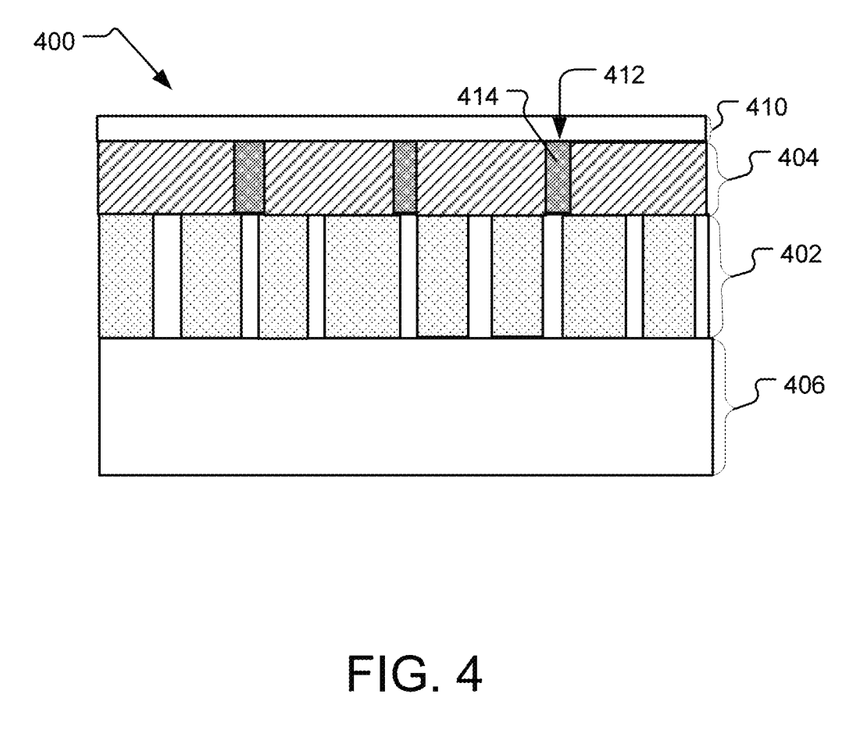
FIG. 4 illustrates cross-sectional view of yet another example magnetic media with a patterned thermal absorption layer.

FIG. 4 illustrates cross-sectional view of yet another example storage media 400 with a patterned thermal absorption layer 404. The patterned thermal absorption layer 404 is formed on top of a granular magnetic recording layer 402, which is formed on a layered stack 406. The design of FIG. 4 differs from that of FIGS. 2 and 3 in that the gaps (e.g., a gap 412) in the patterned thermal absorption layer 408 are filled with a thermally-isolating material 414 which may include any suitable dielectric, for example, silicon oxide, various nitrides, etc.

After the gaps are filled with this thermally-isolating material 414, the overcoat layer 410 is formed to continuously extend across the surface of the media 400, forming a reliable planar surface. In this implementation, the granular magnetic layer 402 is fully encapsulated and inclusion of the thermal isolation material in the gaps of the patterned thermal absorption layer 404 ensures a better (higher) head/media thermal gradient than in the design of FIG. 3 where material of the overcoat layer 410 (e.g., carbon-based or similar) is deposited in the gaps of the patterned thermal absorption layer 404. Characteristics of the storage media 400 not described explicitly with respect to FIG. 4 may be assumed to be the same or similar to other implementations disclosed herein.

Figure 5:
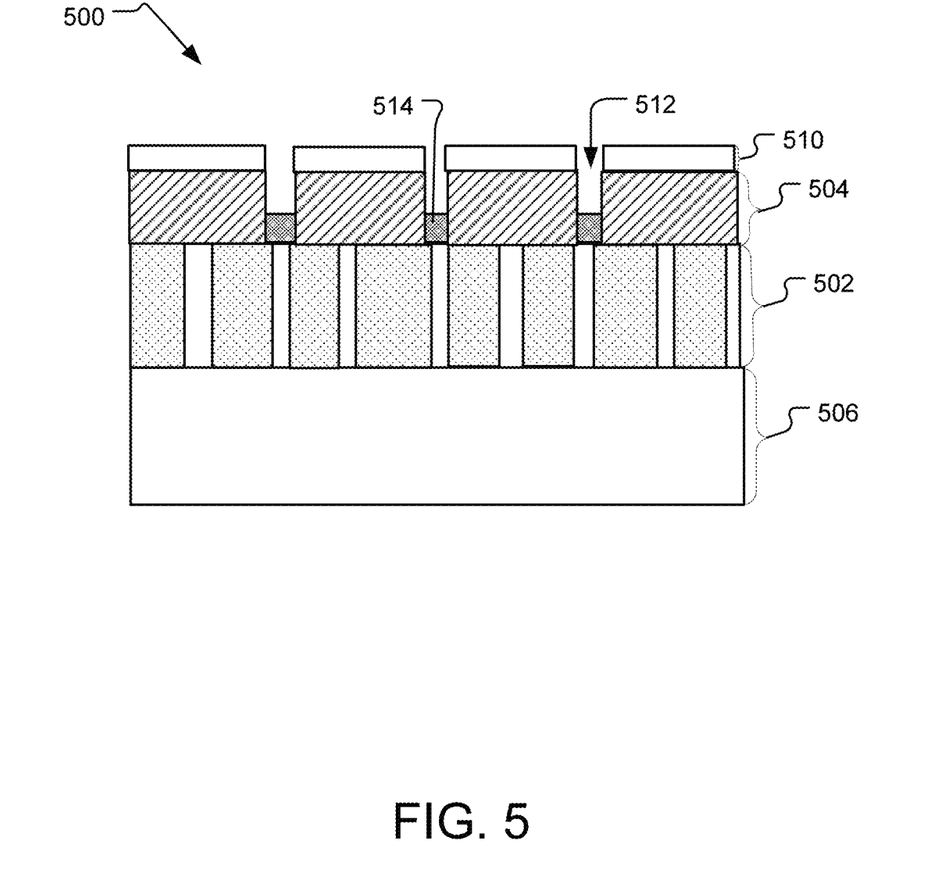
FIG. 5 illustrates cross-sectional view of yet another example magnetic media with a patterned thermal absorption layer.

FIG. 5 illustrates cross-sectional view of yet another example storage media 500 with a patterned thermal absorption layer 504. The patterned thermal absorption layer 504 is formed on top of a granular magnetic recording layer 502, which is formed on a layered stack 506. The design of FIG. 5 differs from that of FIGS. 2 and 3 in that the gaps (e.g., a gap 512) in the patterned thermal absorption layer 508 are partially (but not completely) filled with a thermally-isolating material 514. This design may, for example, be created by depositing material of the patterned thermal absorption layer 504 and overcoat 510, etching through both of the patterned thermal absorption layer 504 and overcoat 510, and then backfilling selective areas of the storage media 500 with the thermally-isolating material 514.

Characteristics of the storage media 500 not described explicitly with respect to FIG. 5 may be assumed to be the same or similar to other implementations disclosed herein.

Figure 6:
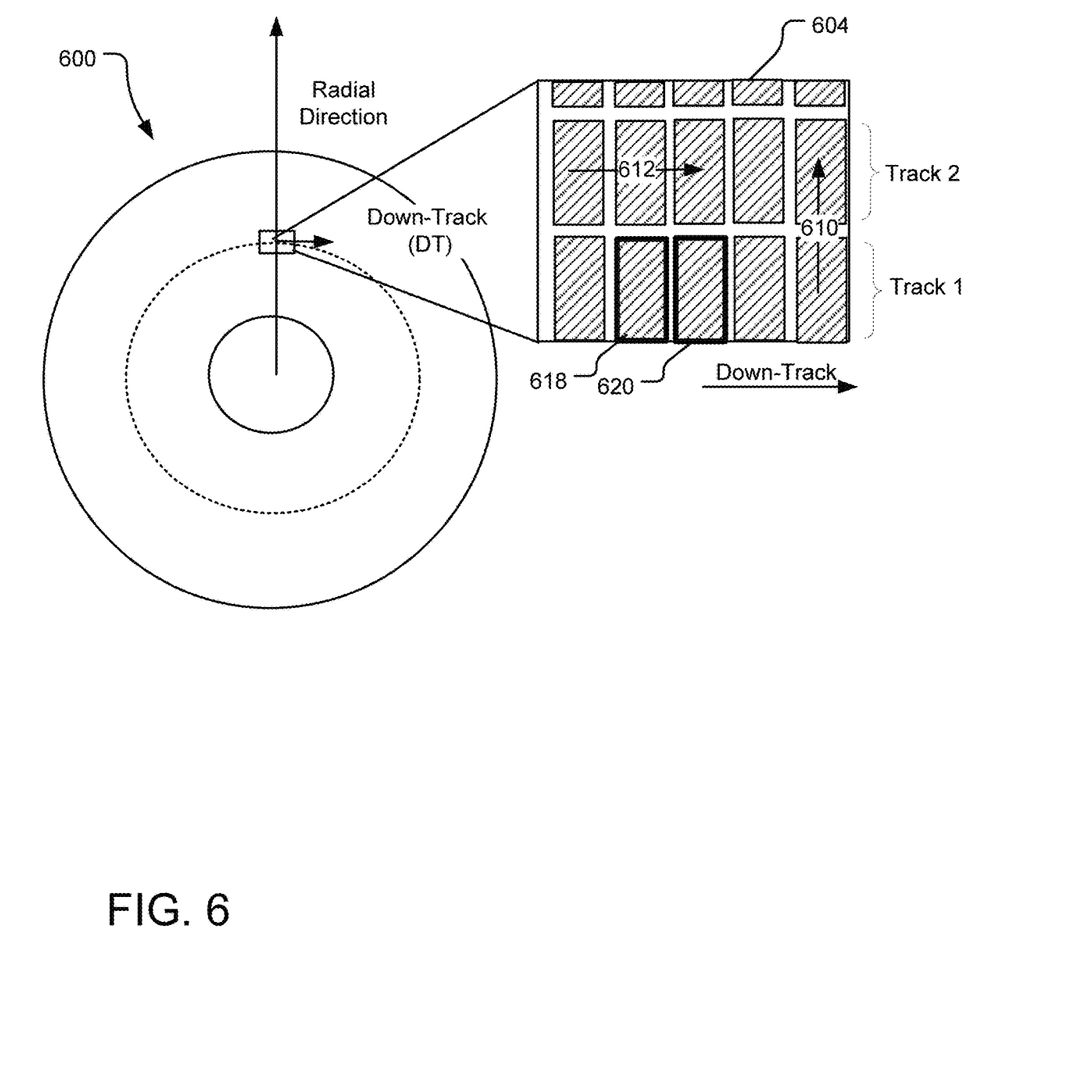
FIG. 6 illustrates patterning of a magnetic media with a thermal absorption patterned in two perpendicular directions.

FIG. 6 illustrates patterning of yet another example patterned thermal absorption layer 604 on a magnetic media 600. Like View C of FIG. 1, the patterned thermal absorption layer 604 is patterned to include rows extending in the cross-track (radial) direction of magnetic media 600 (e.g., a radial direction row indicated by arrow 610). However, the patterned thermal absorption layer 604 of FIG. 6 is additionally patterned to include columns extending in the down-track direction (e.g., a down-track direction column indicated by arrow 612), effectively dividing the material of the patterned thermal absorption layer 604 into rectangular islands 618, 620, etc. According to one implementation, each of the rectangular islands 618, 620, etc. have a radial-direction width that corresponds to (equal or substantially equals) the width of each data track defined on the magnetic media 600. This design is advantageous because it mitigates a phenomena known as "thermal blooming" whereby heat from the NFT (not shown) is absorbed by multiple data tracks, potentially increasing noise, read errors, and/or corrupting data. Here, the dual-direction patterning of the patterned thermal absorption layer 604 provides cross-track isolation, ensuring heat not readily transferred between data bits on directly adjacent data tracks (e.g., there is thermal isolation between Track 1 and Track 2).

Like the other implementations described herein, the patterned thermal absorption layer 604 may be formed on top of a granular magnetic recording layer (not shown) that includes magnetic grains. In one implementation, a controller of the storage device uses the boundaries between islands of the patterned thermal absorption layer 604 to time write transitions such that a different data bit is effectively defined by the magnetic grains generally underlying each of the islands of the patterned thermal absorption layer 604. In effect, each data bit on the magnetic media 600 has a size and position corresponding to one of the rectangular islands of the patterned thermal absorption layer 604. That is, the magnetic grains underlying a first island 618 store data of a first data bit, the magnetic grains underlying a second island 620 stored data of a second data bit, etc.

One downside of the pattern illustrated in FIG. 6 in comparison to the pattern illustrated in FIG. 1 (View C) is that the corresponding device controller may need to implement a two-directional write sync to ensure that write transitions are performed when the write element is centered along each island in the cross-track direction as well as in the down-track direction. In contrast, the pattern shown in FIG. 1 may be implemented with a single-directional write sync (e.g., timing transitions over each island passing in the down-track direction without concern for cross track positioning).

Figure 7:
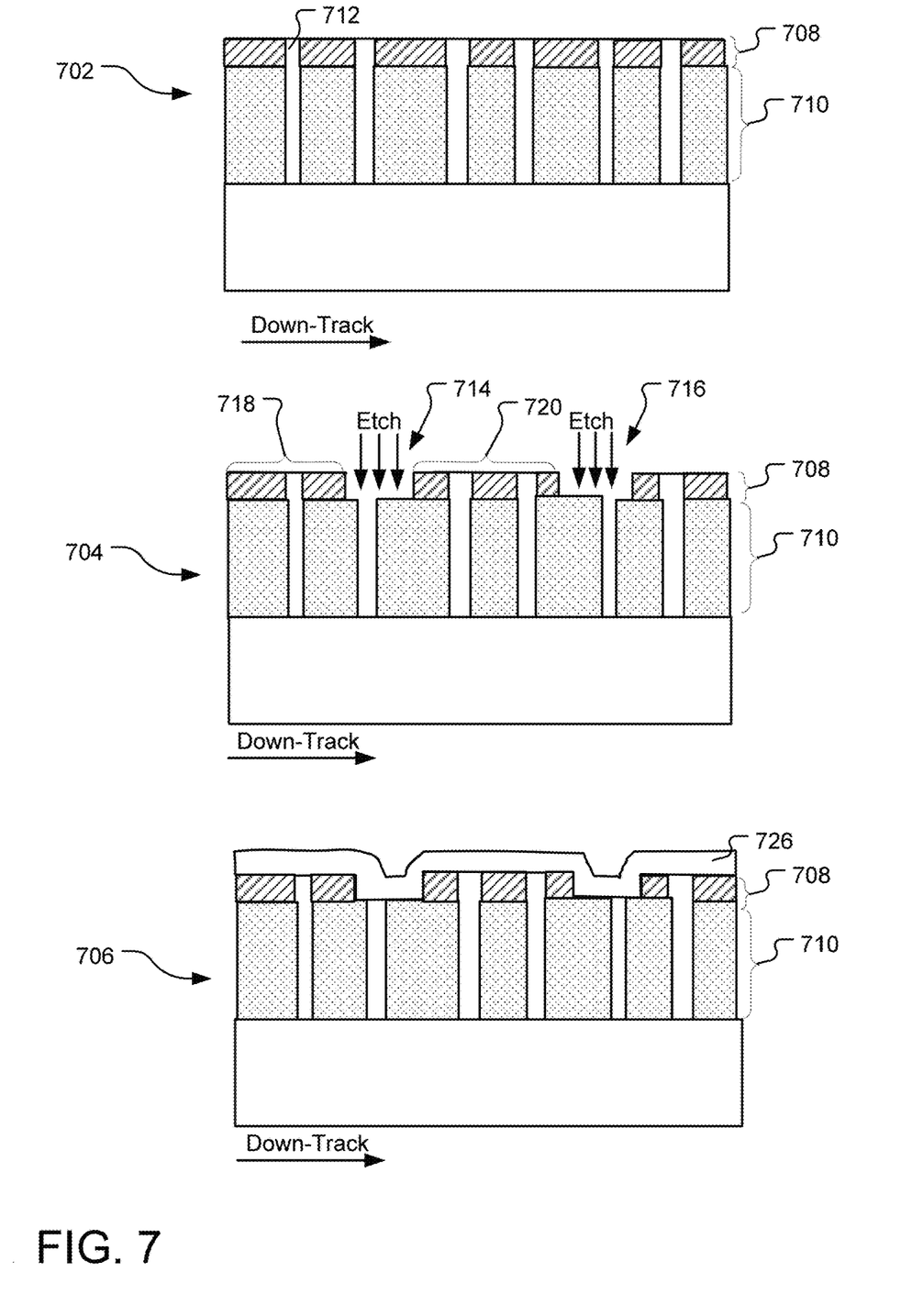
FIG. 7 illustrates views of yet another example magnetic media with a patterned thermal absorption layer.

FIG. 7 illustrates formation stages 702, 704, and 706 of another example patterned thermal absorption layer 708 formed on a granular magnetic recording layer 710. The methodology utilized to create the patterned thermal absorption layer 708 is advantageous because it limits cross-track thermal blooming without the need to perform a two-directional write sync. In this implementation, the patterned thermal absorption layer 708 acts as both an absorption layer (as described with respect to FIGS. 1-6) and an initial switching layer that promotes magnetic transitions of the grains in the granular magnetic recording layer 710. Unlike other patterned thermal absorption layers disclosed herein, the patterned thermal absorption layer 708 is an alloy containing both magnetic material that contains segregants such as oxides and/or nitrides. For example, the alloy may be a coupled granular/continuous (CGC) alloy. When deposited according to certain conditions, this layer epitaxially grows magnetic grains on top of existing grains of the granular magnetic recording layer 710. Segregants 712 in this top magnetic alloy phase segregate to the grain boundaries (e.g., grain boundary 712) as shown in the view 702. After selectively etching areas of the granular top magnetic alloy (as shown by the view 704), a carbon overcoat layer 726 may be deposited, as shown in the view 706.

During a patterning process shown in the view 704, a selective etch is performed to pattern the top-layer alloy to pattern this layer in the down-track direction of the media, as shown. In some implementations, this patterning may divide the patterned thermal absorption layer 708 into rows extending in the cross-track direction. Consequently, the patterning of the patterned thermal absorption layer 708 increases the down-track thermal gradient by providing isolation (e.g., air) between each adjacent pair of data bits, such as data bits underlying the islands 718, 720.

Unlike continuous thermal absorption layers that may suffer a loss of track capability in the cross-track direction due to thermal bloom, the patterned thermal absorption layer 708 does not suffer from cross-track thermal bloom because it is granular and there exists low thermal conductivity segregation at the grain boundaries in the cross-track direction, which allows for a high TPI that is comparable with conventional HAMR media. Accordingly, thermal bloom can be mitigated without performing complex 2D patterning, such as that shown in FIG. 6.

In one implementation, the patterned thermal absorption layer 708 has Curie temperature higher than the Curie temperature (Tc) of the granular magnetic recording layer 710. If the recording process heats up the granular magnetic recording layer 710 to a temperature above its Curie temperature but below the Curie temperature of the patterned thermal absorption layer 708, the patterned thermal absorption layer 708 functions as a recording assist layer. In this case, application of the write field during the heating and recording step causes the patterned thermal absorption layer 708 to magnetically align with the applied field before the granular magnetic recording layer 710, effectively assisting in aligning the grains of the granular magnetic recording layer 710 in the same direction as they cool. This provides an additional effective increase in the down-track thermal gradient.

Because the patterned thermal absorption layer 708 is magnetic, it is magnetically coupled to the granular magnetic recording layer 710 and has a magnetization aligned with the magnetization direction of the underlying magnetic grains. Therefore, this layer contributes to the readback signal and there is no loss due to spacing that would otherwise exist between the read element and the top magnetic layer (e.g., as in other embodiments having a non-magnetic patterned absorption layer).

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A heat-assisted magnetic recording (HAMR) device comprising:
   a magnetic media including:
      a magnetic recording layer comprising a plurality of magnetic grains separated from one another by non-magnetic material; and
      a thermal absorption layer formed on top of the magnetic recording layer, the thermal absorption layer being patterned to include rows extending in a cross-track direction of the magnetic media, each adjacent pair of the rows being separated from one another by an insulating material.

2. The HAMR device of claim 1, wherein the thermal absorption layer is further patterned into columns extending in a down-track direction of the magnetic media, the columns extending in the down-track direction and the rows extending in the cross-track direction dividing the thermal absorption layer into rectangular islands.

3. The HAMR device of claim 1, wherein the rows of the thermal absorption layer are separated from one another by rows of insulating material.

4. The HAMR device of claim 2, wherein a ratio of a down-track length of a gap between each pair of rectangular islands and a down-track length of each of the islands is at least one-ninth.

5. The HAMR device of claim 1, further comprising:
   a read/write controller configured to control a write head to write an individual data bit on the magnetic media by transitioning a group of the magnetic grains to a same magnetic polarity, the individual data bit having a down-track width corresponding to a down-track width of a corresponding one of the rows of the thermal absorption layer extending in the cross-track direction.

6. The HAMR device of claim 2, further comprising:
   a read/write controller configured to control a write head to write an individual data bit on the magnetic media by transitioning a group of the magnetic grains to a same magnetic polarity, the individual data bit having a size corresponding to one of the rectangular islands.

7. The HAMR device of claim 1, wherein the thermal absorption layer is a granular magnetic layer.

8. A system comprising:
   a magnetic media including a thermal absorption layer formed on top of a granular magnetic recording layer, the thermal absorption layer being patterned into rows; and
   a controller configured to control a write element to selectively transition magnetic polarity of a series of data bits contiguously-arranged along a data track of the magnetic media, each adjacent pair of the rows of the thermal absorption layer being separated by an insulating region aligned along an axis with a boundary between an adjacent two data bits in the series of data bits.

9. The system of claim 8, wherein the rows extend in a cross-track direction of the media and the thermal absorption layer is further patterned into columns extending in a down-track direction of the magnetic media, the columns and the rows dividing the thermal absorption layer into rectangular islands.

10. The system of claim 9, wherein each one of the data bits of the series underlies a different one of the rectangular islands.

11. The system of claim 8, wherein the rows of the thermal absorption layer are separated from one another rows of insulating material.

12. The system of claim 11, a ratio of a down-track length of a gap between each pair of rectangular islands and a down-track length of each of the islands is at least one-ninth.

13. The system of claim 8, wherein the thermal absorption layer is a granular magnetic layer.

14. The system of claim 8, wherein the insulating region between each pair of the rows is adapted to increase a thermal gradient between a corresponding pair of data bits in the series.

15. A method comprising:
controlling a write element to selectively transition magnetic polarity of a series contiguous data bits aligned along a data track of a magnetic media, the magnetic media including a thermal absorption layer patterned into rows on top of a granular magnetic recording layer, each adjacent pair of the rows of the thermal absorption layer being separated by an insulating region aligned along an axis with a boundary between an adjacent two data bits in the series.

16. The method of claim 15, wherein the rows extend in a cross-track direction of the media and the thermal absorption layer is further patterned into columns extending in a down-track direction of the magnetic media, the columns and the rows dividing the thermal absorption layer into rectangular islands.

17. The method of claim 16, wherein each one of the data bits of the series underlies a different one of the rectangular islands.

18. The method of claim 16, wherein controlling the write element further comprises:
executing logic to ensure a single-dimensional write sync.

19. The method of claim 16, wherein controlling the write element further comprises:
executing logic to ensure a two-dimensional write sync.

20. The method of claim 16, wherein the insulating region between each pair of the rows is adapted to increase a thermal gradient between a corresponding pair of data bits in the series.

* * * * *